Figures 1, 2:
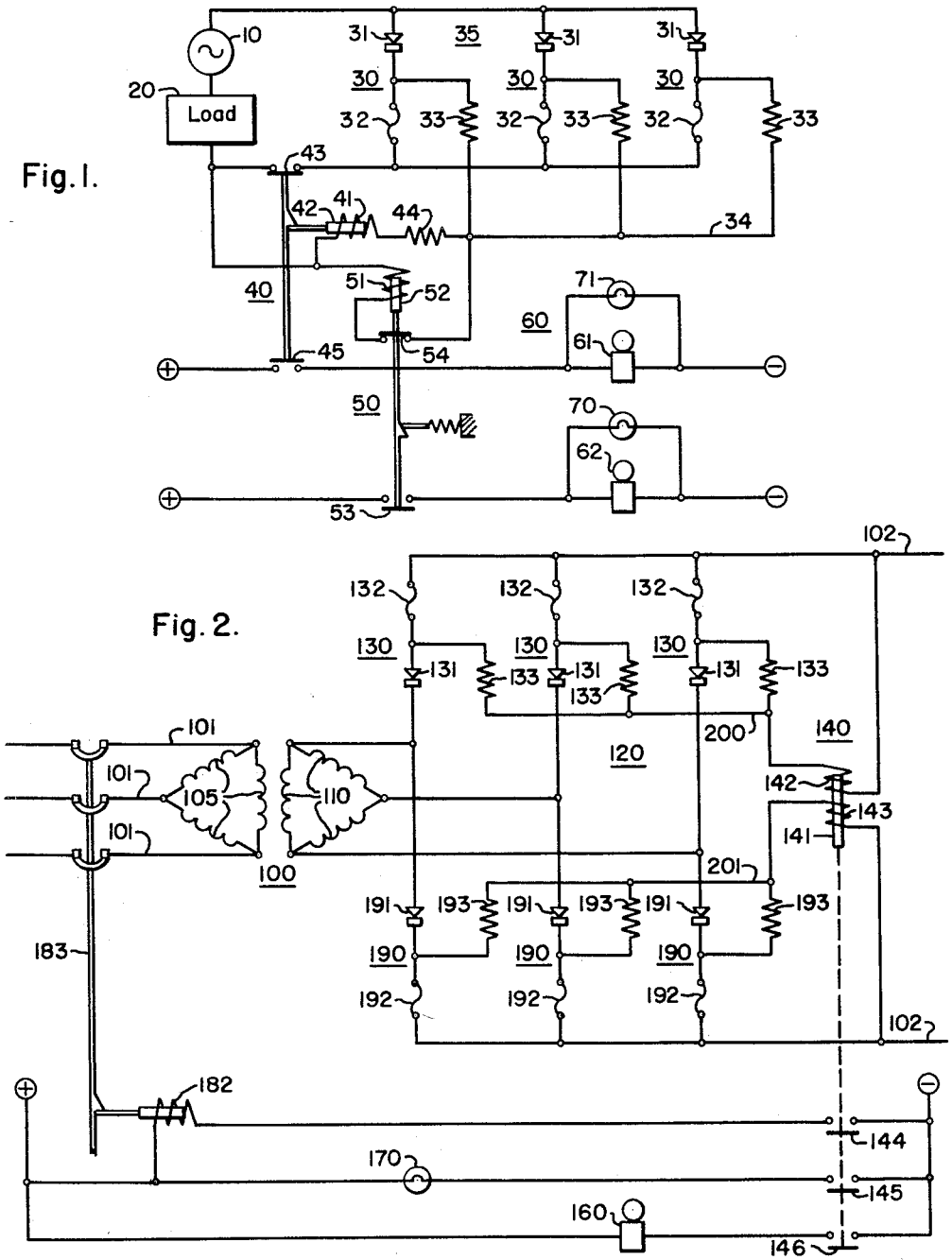

July 17, 1962     A. P. COLAIACO     3,045,167
DETECTION CIRCUIT
Filed Oct. 10, 1958

WITNESSES:
Bernard R. Gieguay
Myron E. Click

INVENTOR
August P. Colaiaco
BY
F. E. Browder
ATTORNEY

United States Patent Office 3,045,167
Patented July 17, 1962

3,045,167
DETECTION CIRCUIT
August P. Colaiaco, Forest Hills, Pa., assignor to Westinghouse Electric Corporation, East Pittsburgh, Pa., a corporation of Pennsylvania
Filed Oct. 10, 1958, Ser. No. 766,534
4 Claims. (Cl. 321—14)

This invention relates to detection circuits in general and in particular to detection circuits for indicating the failure of parallel connected semiconductor rectifier diodes.

In the application of semiconductor rectifiers in power supply applications rated at thousands of amperes it is expedient to connect a number of semiconductor rectifier diodes in a parallel bank to obtain the desired current rating. The diodes are conventionally protected by individual fuses so that when one of the diodes shorts, the fuse will blow taking the diode out of the circuit and allowing the rectifier bank to remain in operation. However, should more than a prescribed number of diodes fail in the same parallel group, the rectifier bank should be taken off the line in order to prevent damage to the remaining units in the parallel group. It is at least desirable that the operator should be warned that the maximum number of diodes have failed.

Accordingly, it is an object of this invention to provide an improved detection circuit.

It is another object of this invention to provide an improved detector circuit for indicating a rectifier diode failure in a parallel connected group of a plurality of rectifier diodes.

It is still another object of this invention to provide a detection circuit which indicates the failure of a first semiconductor diode in a plurality of parallel connected semiconductor diodes, and also to indicate the failure of a predetermined number of said diodes.

Further objects of this invention will become apparent from the following description when taken in conjunction with the accompanying drawing. In said drawing, for illustrative purposes only, there are shown preferred embodiments of this invention.

FIGURE 1 is a schematic diagram illustrating a first embodiment of the teachings of this invention; and FIGURE 2 is a schematic diagram of the teachings of a second embodiment of this invention.

Referring to FIG. 1 there is illustrated a simplified version of the teachings of this invention comprising a source of alternating supply voltage 10 connected to supply a load 20 through a plurality of rectifier legs 30 connected in parallel in a rectifier bank 35.

Each of the parallel rectifier legs 30 comprises a series connected semiconductor rectifier 31 and its individual fuse 32. A common alarm bus 34 is provided to which a plurality of current limiting impedances 33 are connected by one of their leads. Each of the limiting resistors 33 has its other lead connected to a point intermediate of one of said power rectifier units 31 and its corresponding fuse 32.

A circuit means, which is responsive to current flow in the common alarm bus 34, is designated generally at the reference character 60. The circuit means 60 comprises a first relay means 40 and a second relay means 50. The relay means 40 comprises a relay winding 41 and a current limiting resistor 44 connected in series between the common alarm bus 34 and to the side of the rectifier bank 35 to which the fuses 32 are connected. The relay 40 has an armature 42 inductively disposed with respect to said winding 41 and contacts 43 which are in the load circuit supplying power to the load 20.

The relay 50 comprises a relay winding 51, an armature 52, normally closed back contacts 54 and normally open contacts 53. The normally closed back contacts 54 and the relay winding 51 are connected in series between the common alarm bus 34 and to the side of the rectifier bank 35 to which the fuses 32 are connected. The relays 40 and 50 may be latch type relays. That is, once the relays 40 and 50 are activated from their normal positions they remain in the activated position even though energizing current no longer flows therethrough. The relay 40 may also be provided with contacts 45. The contacts 45 are normally open and, when closed, will activate an indicating alarm. The indicating alarm may be the indicating lamp 71 or the buzzer 61 connected to a voltage source and may be activated by closure of the contacts 45.

The contacts 53 operate to close a circuit to furnish voltage to an indicating lamp 70 and a buzzer 62. Either the buzzer alarm 62 or the indicating lamp 70 may be eliminated, and other suitable audible or visual alarm means denoting a diode failure may be connected to be activated by the contacts 53.

The operation of the apparatus of FIG. 1 will now be described. If one of the semiconductor rectifiers 31 fails or shorts, its respective current limiting fuse 32 will blow clearing the fault. The voltage from the source 10 will now be applied across the respective current limiting resistor 33, causing current flow in the alarm bus 34. Current flow in the alarm bus 34 will also cause a current flow in the relay winding 51 of the relay 50 causing it to activate the armature 52 which will close the contacts 53 and open the contacts 54. The closing of the contacts 53 will activate the alarm for the failure of one of the alarm devices such as the buzzer 62 or the indicating lamp 70, as desired. If the relay 50 is of the latch type, then the back contacts 54 may be utilized to take the relay winding 51 out of the power circuit after the relay 50 has operated to close the contacts 53. Thus, there is no further current through the winding 51 allowing no further power dissipation or danger of damaging the relay 50.

The relay 40 is also responsive to current flow in the common alarm bus 34. However, the relay 40 may be prevented from operating at the current level available in the alarm bus 34 after the failure of only one diode 31 by any one of several different means. The method shown in FIG. 1 is to connect a current limiting resistor 44 in series with the relay winding 41 of the relay 40. The current limiting resistor 44 has a value so chosen that until a predetermined number of the rectifier diodes 31 have failed and placed their respective resistors 33 in parallel, the current limiting resistor 44 will limit the current through the relay winding 41 to prevent its operation until after said predetermined number of diodes have failed. In experimental tests the values of the resistors 33 were set at 500 ohms.

After the predetermined number of diodes have failed, there will be sufficient current in the alarm bus 34 to operate the relay 40 causing the contacts 43 to be opened which will interrupt the supplying of power from the voltage source 10 to the load 20. As hereinbefore mentioned, the relay 40 may also be provided with a pair of contacts 45 which are normally open. Upon operation of the relay 40, the alarm means, shown in FIG. 1 as an indicating lamp 71 and buzzer 61, will be activated. The relay 40 may also be of the latch type so that initial operation is sufficient to keep the contacts 43 and 45 in place even though power or current is removed from the relay winding 41. If the relays 40 and 50 are of the latch type, they may be either of the manually or automatic reset type. An example of a commercially available relay, which will perform the functions of the relays 40 and 50, is the Struther Dunn, Type 112XBX150.

Referring to FIG. 2 there is shown a rectifier system which is supplied from a three-phase alternating current line 101 which may, if desired, include a circuit breaker 183 of any suitable type. The circuit breaker 183 is shown as having a trip coil 182 for effecting the opening of the breaker 183 and may be actuated to a closed position manually or by any suitable means. The rectifier system shown in FIG. 2 is connected to the three-phase line 101 by means of a transformer 100 to reduce the voltage to a suitable value to give the desired direct-current output voltage on the direct current buses 102. A transformer primary 105 is delta connected in the three-phase line 101. A transformer secondary 110 is delta connected to a three-phase bridge rectifying arrangement 120. A plurality of legs 130 are connected from one side of the direct-current bus 102 to the three-phase supply from the secondary 110. A plurality of legs 190 are connected from the other side of the direct-current bus 102 to the secondary winding 110.

Each leg 130 comprises a power rectifier 131 serially connected with a protective fuse 132. A current limiting resistor 133 is connected from a point intermediate of the power rectifier 131 and its individual fuse 132 to a common alarm bus 200. The common alarm bus 200 is connected through a relay winding 141 of a relay 140 to the direct current bus 102 which connects to the respective fuses 132.

The legs 190 each comprises an individual power rectifier 191 connected in series with its individual protective fuse 192. A current limiting resistor 193 is connected from a point intermediate of the rectifier 191 and its individual fuse 192 to a common alarm bus 201. The common alarm bus 201 is connected through a winding 143 of the relay 140 to the direct-current bus 102 which connects the respective individual fuses 192.

The relay 140 has an armature 141 having connected thereto contacts 144, 145 and 146. The contacts 144, 145 and 146 are normally opened. If the contacts 144 are closed, it activates the trip coil 182 of the breaker 183 interrupting the three-phase alternating current supplied by the lines 101. If the contacts 145 are closed, an indicating lamp 170 is energized. If the contacts 146 are closed, a buzzer 160 is energized. The teachings of this invention may be practiced by providing individual energizing means for the breaker 183 or the indicating lamp 170 or the buzzer 160 or any other desired alarm and warning system.

Referring again to the rectifier bank 120 whenever a rectifier 131 or 191 in any of the plurality of legs 130 and 190 fails, its respective associated individual fuse 132 or 192 blows placing the resistor 133 or 193 across the phase-to-phase voltage of the rectifier system 120. The failure of one of the power rectifier diodes 131 or 191 will thus allow current to flow in one or both of the common alarm buses 200 and 201. Therefore, the relay 140 is energized and the actuation of the armature 141 will close the contacts 144, 145 and 146 to give the desired alarm or take the proper protective measures.

It is to be noted that the rectifier units 131 and 191, although operably monitored in a system as shown in FIG. 2, may also be representative of a plurality of rectifiers connected in parallel in a single leg 130 or 190 of a rectifier system 120. If a plurality of power rectifier units are connected in parallel in a single leg of the bridge arrangement 120, then the teachings and circuit connections of FIG. 1 may be applied and utilized in the apparatus of FIG. 2. The rectifier units 131 and 191 were represented as single units for purposes of simplicity and clarity in explaining the operation of the schematic diagrams embodying the teachings of this invention. The relays shown in the above embodiments are meant to be representative of any electronic or electromechanical device capable of operating to perform their function as desired. For example, semiconductor devices, magnetic amplifiers or electronic tubes may be employed to perform switching functions which will activate alarm means such as the buzzer and indicating lamp, or activate a circuit breaker to disconnect the bank from a power source.

Thus, the circuits of FIGS. 1 and 2 may be combined to indicate whenever one of a group of parallel diodes in a single leg of a rectifier system has failed, by lighting a lamp or sounding an alarm for example, and, after the failure of a predetermined number of diodes in the single leg, the entire rectifier system may be disconnected from the supply voltage.

In conclusion, it is pointed out that while the illustrated examples constitute a practical embodiment or embodiments of my invention, I do not limit myself to the exact details shown, since modification of the same may be effected without departing from the spirit and scope of this invention.

I claim as my invention:

1. In a rectifier system comprising a plurality of rectifier units connected in parallel forming a rectifier bank; an individual fuse in series with each rectifier unit; a common alarm bus connected to the same side of said rectifier bank to which said fuses are connected; a circuit responsive to the voltage across said individual fuses; said circuit comprising a plurality of current limiting resistors, each of said current limiting resistors being connected at one side to a point intermediate of one of said rectifier units and its corresponding fuse and at its other side to said common alarm bus; and means responsive to current flow in said alarm bus comprising first and second switching means; said first switching means being operable to activate alarm means in response to the failure of one of said rectifier units; said second switching means being operable to disconnect said rectifier bank from a power source in response to the failure of a predetermined number of said rectifier units.

2. In a rectifier system comprising a plurality of rectifier units connected in parallel forming a rectifier bank; an individual fuse in series with each rectifier unit; a common alarm bus connected to the same side of said rectifier bank to which said fuses are connected; a circuit responsive to the voltage across said individual fuses; said circuit comprising a plurality of current limiting resistors, each of said current limiting resistors being connected at one side to a point intermediate of one of said rectifier units and its corresponding fuse and at its other side to said common alarm bus; and means responsive to current flow in said alarm bus comprising first and second switching means; said first switching means being operable to activate alarm means in response to the failure of one of said rectifier units; said second switching means being operable to activate additional alarm means in response to the failure of a predetermined number of said rectifier units.

3. In a rectifier system comprising a plurality of rectifier units connected in parallel forming a rectifier bank; an individual fuse in series with each rectifier unit; a common alarm bus connected to the same side of said rectifier bank to which said fuses are connected; a circuit responsive to the voltage across said individual fuses; said circuit comprising a plurality of current limiting resistors, each of said current limiting resistors being connected at one side to a point intermediate of one of said rectifier units and its corresponding fuse and at its other side to said common alarm bus; and means responsive to current flow in said alarm bus comprising first and second relay means; said first relay means being operable to activate alarm means in response to a failure of a first rectifier unit; said second relay means being operable to disconnect said rectifier bank from a power source in response to the failure of a predetermined number of said rectifier units.

4. In a rectifier system comprising a plurality of rectifier units connected in parallel forming a rectifier bank; an individual fuse in series with each rectifier unit; a common alarm bus connected to the same side of said rectifier bank to which said fuses are connected; a circuit responsive to the voltage across said individual fuses; said circuit comprising a plurality of current limiting resistors, each of said current limiting resistors being connected at one side to a point intermediate of one of said rectifier units and its corresponding fuse and at its other side to said common alarm bus; and means responsive to current flow in said alarm bus comprising first and second relay means; said first relay means being operable to activate alarm means in response to a failure of a first rectifier unit; said second relay means being operable to disconnect said rectifier bank from a power source and activate additional alarm means in response to the failure of a predetermined number of said rectifier units.

References Cited in the file of this patent

UNITED STATES PATENTS

| | | |
|---|---|---|
| 2,325,361 | Bany | July 27, 1943 |
| 2,728,043 | Derr et al. | Dec. 20, 1955 |
| 2,807,771 | Winograd | Sept. 24, 1957 |
| 2,813,243 | Christian et al. | Nov. 12, 1957 |
| 2,930,961 | Lezan | Mar. 29, 1960 |